(12) United States Patent
Herbers et al.

(10) Patent No.: US 11,499,637 B2
(45) Date of Patent: Nov. 15, 2022

(54) LIP SEAL

(71) Applicant: Caterpillar Inc., Deerfield, IL (US)

(72) Inventors: Brice James Herbers, Peoria, IL (US); Mark J. Kiesel, Peoria, IL (US); Hong Lian, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1101 days.

(21) Appl. No.: 16/127,528

(22) Filed: Sep. 11, 2018

(65) Prior Publication Data
US 2020/0079444 A1 Mar. 12, 2020

(51) Int. Cl.
F16J 15/3204 (2016.01)
B62D 55/088 (2006.01)
B62D 55/21 (2006.01)

(52) U.S. Cl.
CPC ...... F16J 15/3204 (2013.01); B62D 55/0887 (2013.01); B62D 55/21 (2013.01)

(58) Field of Classification Search
CPC ... F16J 15/3204; B62D 55/0887; B62D 55/21
See application file for complete search history.

(56) References Cited

U.S. PATENT DOCUMENTS

| 3,052,478 | A | * | 9/1962 | Horvereid | F16J 15/32 277/648 |
| 3,347,555 | A | * | 10/1967 | Norton | F16J 15/3204 277/455 |
| 4,132,418 | A | * | 1/1979 | Roli | B62D 55/0887 277/382 |
| 4,304,415 | A | * | 12/1981 | Wolf | F16L 47/065 277/625 |
| 4,331,339 | A | | 5/1982 | Reinsma | |
| 4,392,657 | A | * | 7/1983 | Roley | F16J 15/3456 277/383 |
| 4,530,675 | A | * | 7/1985 | Mazziotti | F16C 33/7809 277/362 |
| 4,834,037 | A | * | 5/1989 | Lafever | F16J 15/3284 277/572 |
| 5,261,677 | A | * | 11/1993 | Gotoh | F16J 15/024 277/549 |
| 5,738,358 | A | * | 4/1998 | Kalsi | F16J 15/3224 277/584 |

(Continued)

FOREIGN PATENT DOCUMENTS

CN 204985722 U * 1/2016 ......... B62D 55/0887
DE 102012223903 A1 6/2014
(Continued)

Primary Examiner — Vishal A Patel
(74) Attorney, Agent, or Firm — Harrity & Harrity LLP

(57) ABSTRACT

A seal includes an annular body defining a radial direction, an axial direction, and a circumferential direction; and further defines a cross-sectional area including a perimeter. The perimeter may comprise a first axial extremity, a second axial extremity, an outer radial extremity, and an inner radial extremity. The perimeter may include a first axial extremity defining surface and a second axial extremity defining surface, a first concave arcuate surface interposed between the inner radial extremity and the second axial extremity, and a second concave arcuate surface interposed between the outer radial extremity and the second axial extremity.

20 Claims, 8 Drawing Sheets

(56) References Cited

U.S. PATENT DOCUMENTS

| | | | | |
|---|---|---|---|---|
| 5,873,576 | A * | 2/1999 | Dietle | F16J 15/164 |
| | | | | 277/587 |
| 6,343,623 | B2 * | 2/2002 | Hegler | F16L 25/0036 |
| | | | | 285/903 |
| 8,721,213 | B2 * | 5/2014 | Johannsen | E02F 9/02 |
| | | | | 277/307 |
| 9,409,612 | B2 * | 8/2016 | Mathew | F16C 11/045 |
| 9,845,801 | B1 * | 12/2017 | Shek | F04B 53/02 |
| 10,351,309 | B2 * | 7/2019 | Brozell | B65D 53/02 |
| 2009/0218772 | A1 | 9/2009 | Asplund et al. | |
| 2012/0161510 | A1 | 6/2012 | Diekevers et al. | |
| 2016/0076650 | A1 | 3/2016 | Armitage et al. | |
| 2016/0176454 | A1 | 6/2016 | Diekevers et al. | |

FOREIGN PATENT DOCUMENTS

| | | |
|---|---|---|
| DE | 102013217147 A1 | 3/2015 |
| EP | 3502521 A1 | 6/2019 |

* cited by examiner

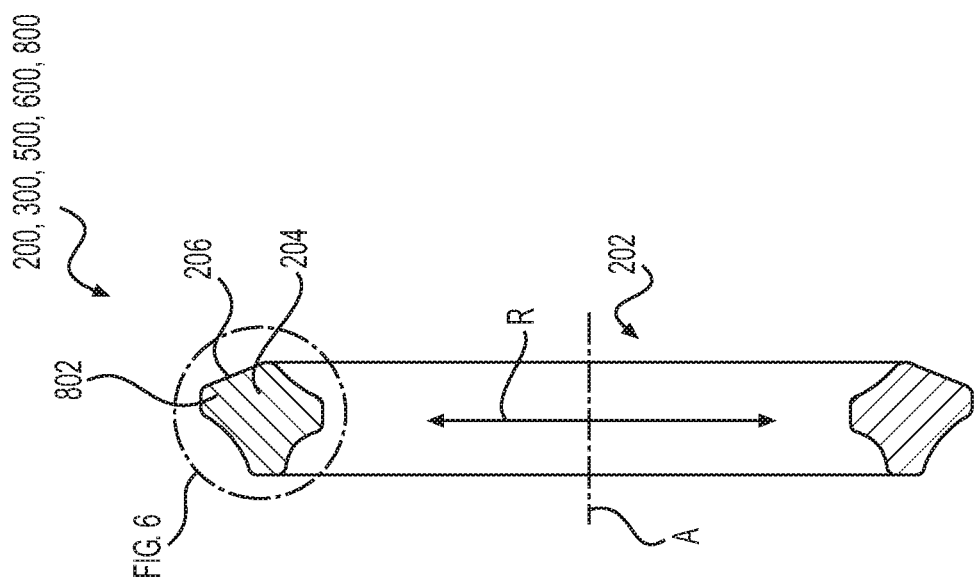
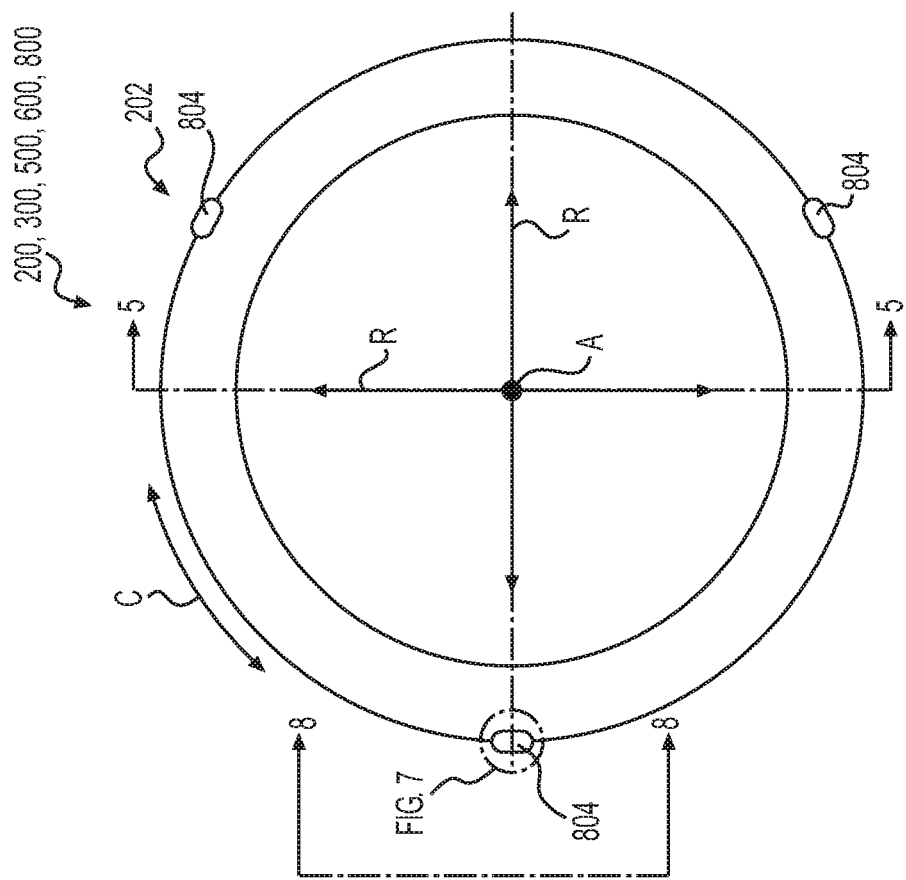

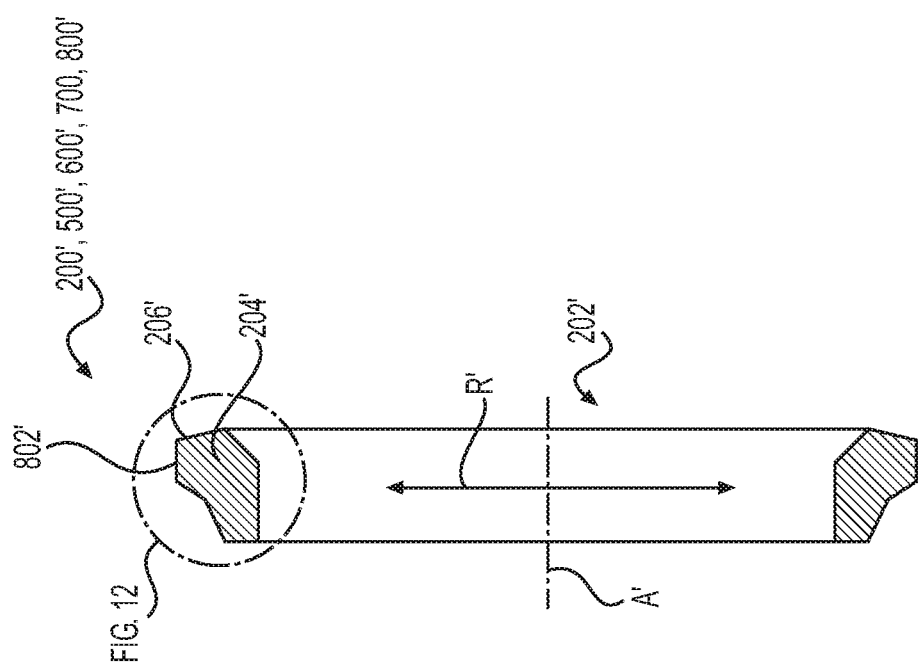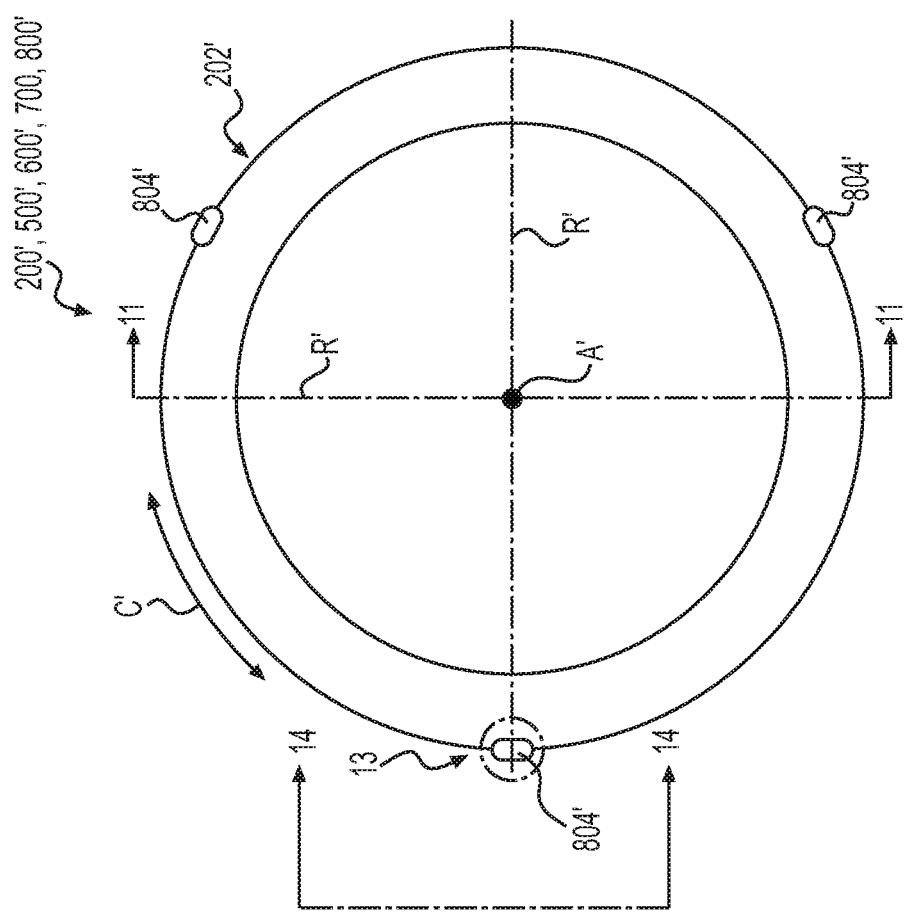

LIP SEAL

TECHNICAL FIELD

The present disclosure relates to lip seals such as those used in the track chains of track driven vehicles and the like. Specifically, the present disclosure relates to a lip seal that may be used without needing a thrust ring used in the track chains of track driven machines such as those used in the earth moving, construction, agriculture and mining industries and the like.

BACKGROUND

Machines, such as those used in the earth moving, construction, and mining industries use lip seals in their track chain assemblies to allow the various components such as track links, track pins, and track bushings, etc. to rotate relative to each other while sealing in lubricant to prolong the useful life of these rotating or oscillating joints.

Over time, these lip seals may wear out or loose a suitable amount of loading force to push the lip seal into contact to a member of the track chain. Consequently, the lubricant such as grease may begin to leak. Once the joint loses the lubricant, heat, galling, deformation, etc. may start to occur, requiring that the track chain be repaired or replaced. In addition, contaminants may infiltrate into the joint, exacerbating these problems and leading to a premature replacement of the track chain. This may result in undesirable downtime for the machine.

Various prior art solutions have been developed but do not always provide enough contact pressure between the lip seal and its neighboring track chain member. Also, an extra component in the form of a thrust ring may also be provided or be needed, increasing the cost of the track chain undesirably.

U.S. Pat. Application Publ. No. 2016/0176454A1 to Diekevers et al. discloses a track pin joint assembly that includes a pin, a first link, a second link pivotable with respect to the first link about the pin, and a seal assembly. The seal assembly includes a seal ring, a load ring, and a seal lip. The load ring is mounted to the seal ring and is sealingly engaged with the first link. The seal lip is connected to the second link such that the seal lip circumscribes the pin passage of the second link and extends axially from the second link toward the seal ring. The seal lip is in sealing contact with the radial flange of the seal ring (see the Abstract of Diekevers). Furthermore, thrust rings are provided that are configured to transmit axial loads between adjacent track link members (see paragraph 62 of Diekevers).

As can be seen, prior art solutions require multiple components that increase the cost of the seal assemblies and the track chain assemblies. Also, the prior art solutions may not provide enough contact pressure in some applications.

SUMMARY

A seal according to an embodiment of the present disclosure comprises an annular body defining a radial direction, an axial direction, and a circumferential direction; and further defines a cross-sectional area including a perimeter. The perimeter may comprise a first axial extremity, a second axial extremity, an outer radial extremity, and an inner radial extremity. The perimeter further includes a first angled surface forming a first acute angle with the radial direction ranging from 10 degrees to 30 degrees, a second angled surface forming a second acute angle with the radial direction ranging from 30 degrees to 50 degrees, and a first convex arcuate surface interposed between the first angled surface and the second angled surface, the first convex arcuate surface defining the first axial extremity and defining a first convex arcuate surface radius of curvature ranging from 0.01 mm to 1.0 mm.

A seal according to an embodiment of the present disclosure comprises an annular body defining a radial direction, an axial direction, and a circumferential direction; and further defines a cross-sectional area including a perimeter. The perimeter may comprise a first axial extremity, a second axial extremity, an outer radial extremity, and an inner radial extremity. The perimeter may include a first axial extremity defining surface and a second axial extremity defining surface, a first concave arcuate surface interposed between the inner radial extremity and the second axial extremity, and a second concave arcuate surface interposed between the outer radial extremity and the second axial extremity.

A seal according to an embodiment of the present disclosure comprises an annular body defining a radial direction, an axial direction, and a circumferential direction; and further defines a cross-sectional area including a perimeter. The perimeter may comprise a first axial extremity, a second axial extremity, an outer radial extremity, and an inner radial extremity. The perimeter may include a first axial extremity defining surface and a second axial extremity defining surface, a first concave arcuate surface interposed between the inner radial extremity and the second axial extremity, a second concave arcuate surface interposed between the outer radial extremity and the second axial extremity, a first angled surface interposed between the outer radial extremity and the first axial extremity, and a second angled surface interposed between the inner radial extremity and the first axial extremity.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 4 is a front view of the lip seal shown in FIG. 3.

FIG. 5 is a cross-sectional view of the lip seal of FIG. 4 taken along a plane containing the radial direction and the axial direction of the lip seal.

FIG. 10 is a front view of another embodiment of a lip seal that may be used in the track chain assembly of FIG. 9.

FIG. 11 is a cross-sectional view of the lip seal of FIG. 10 taken along a plane containing the radial direction and the axial direction of the lip seal.

DETAILED DESCRIPTION

Figure 1:
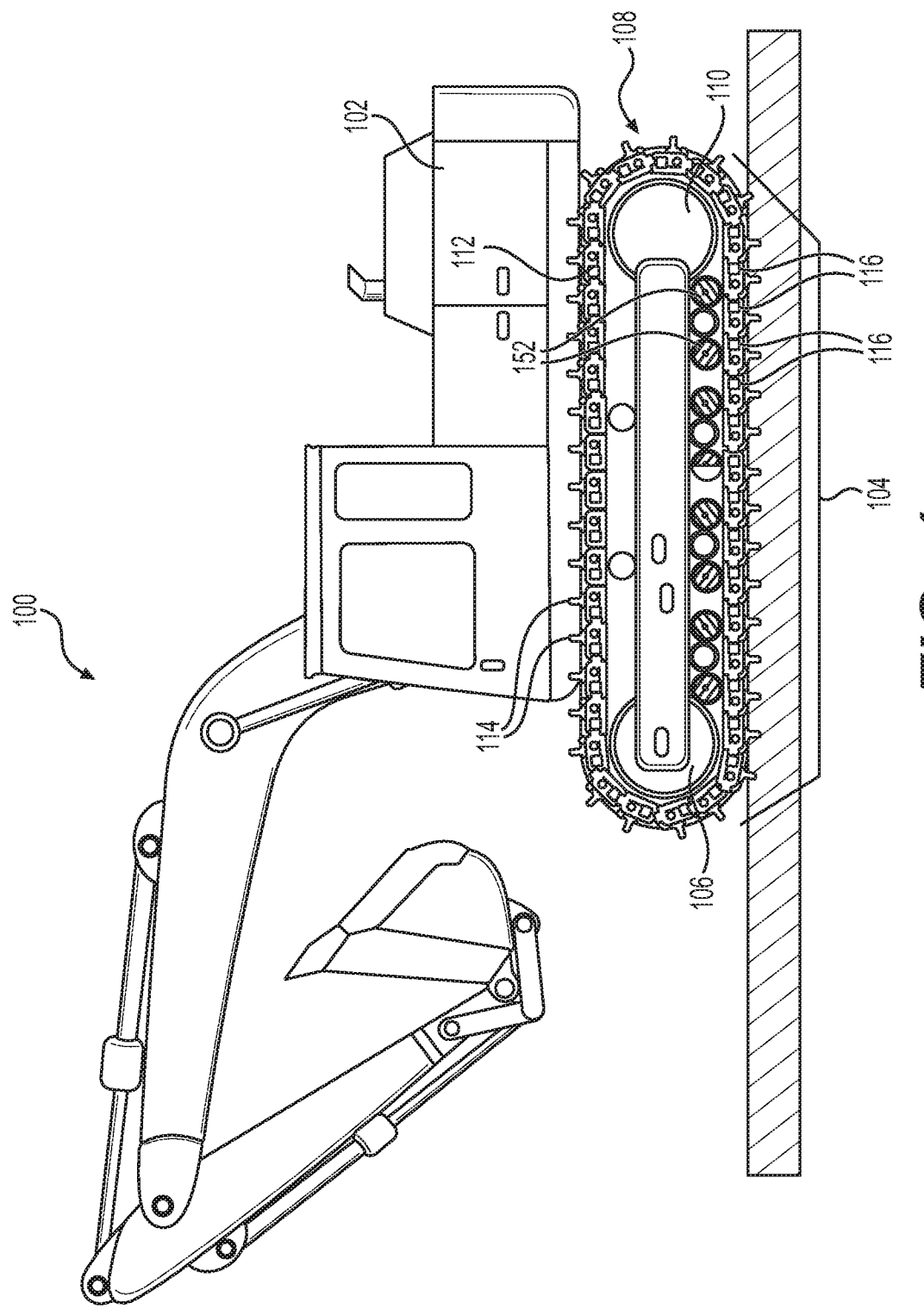
FIG. 1 is a perspective view of a track-type machine which includes a track using a lip seal according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of seal such as a lip seal for use with a track chain assembly using various configurations that may eliminate the use of a thrust ring will now be discussed. The track chain assemblies may be used on various track-driven machines as will now be described.

FIG. 1 illustrates an exemplary machine 100 having multiple systems and components that cooperate to accomplish a task. Machine 100 may embody a mobile machine that performs some type of operation associated with an industry such as mining, construction, farming, earth moving, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, hydraulic motor, electric power cord or any other source of power known in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a track chain assembly 112 and a plurality of track shoes 114, each configured to selectively engage a surface, e.g., the ground. Each chain 112 may include a plurality of link subassemblies 116. Track rollers 152 are also provided at the bottom of the track to support the chain.

Figure 2:
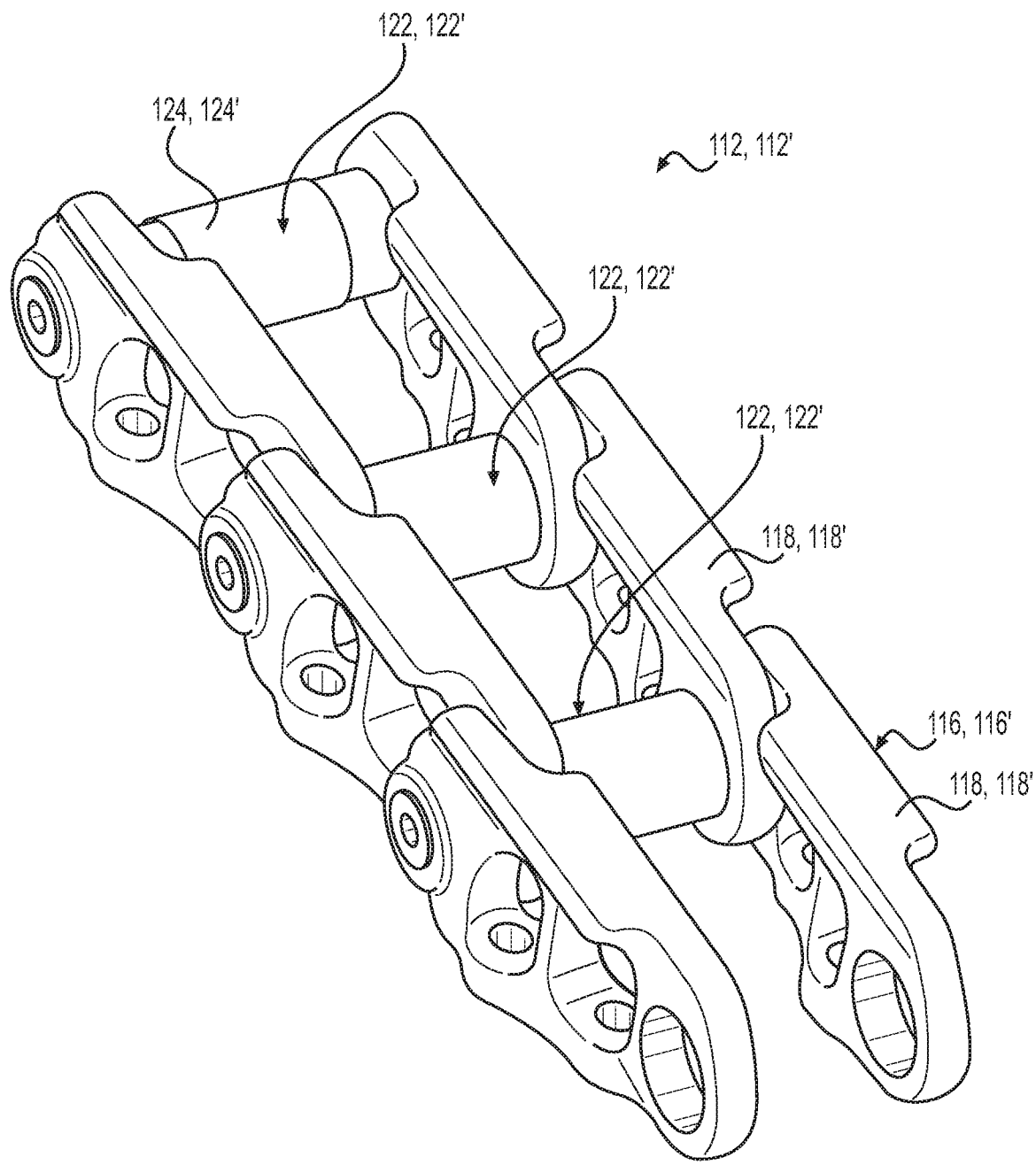
FIG. 2 is a perspective view of a portion of the track chain using a lip seal according to an embodiment of FIG. 1.
Figure 3:
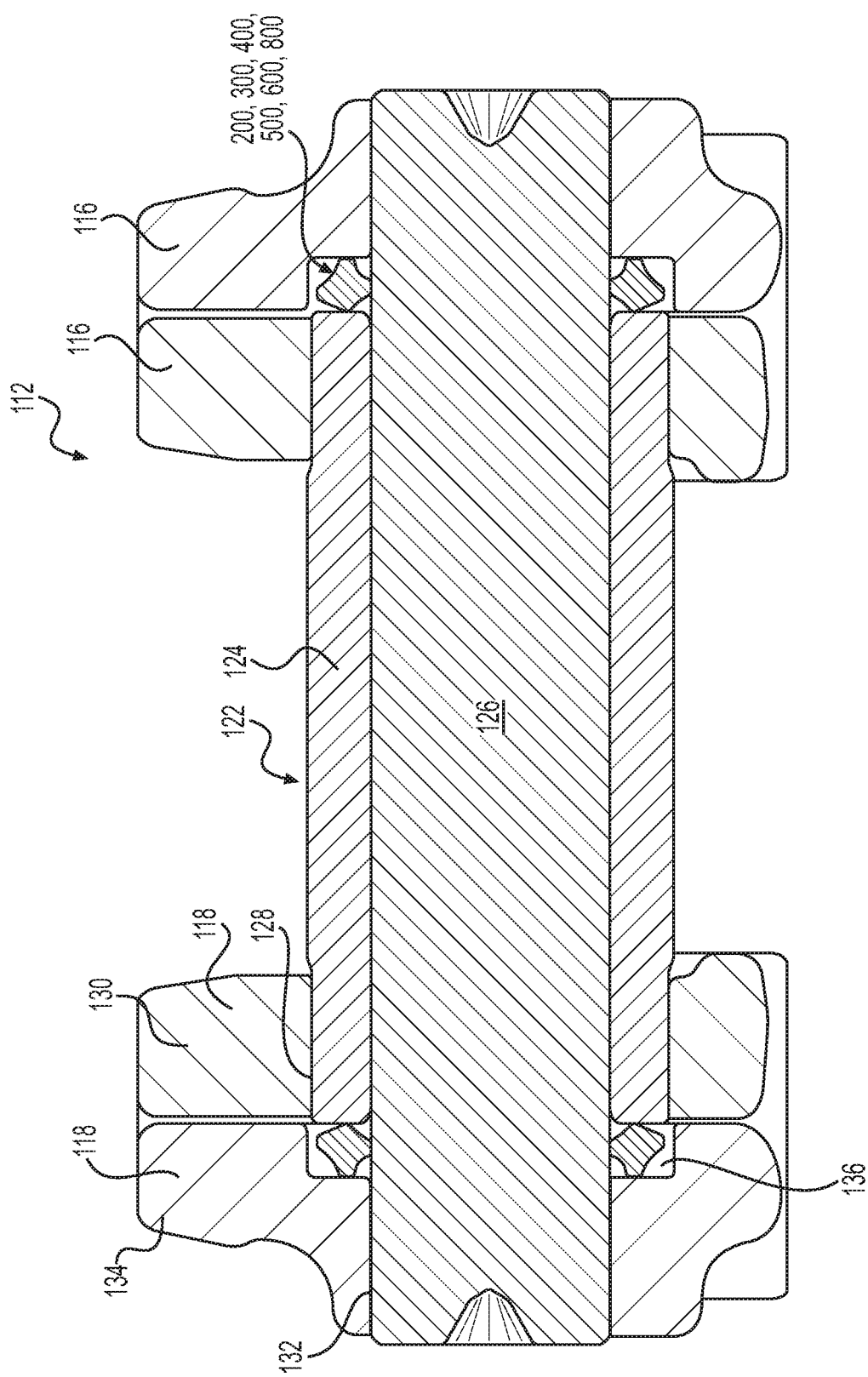
FIG. 3 is a cross-sectional view of the track chain assembly, showing the use of a lip seal according to an embodiment of the present disclosure.
Figure 9:
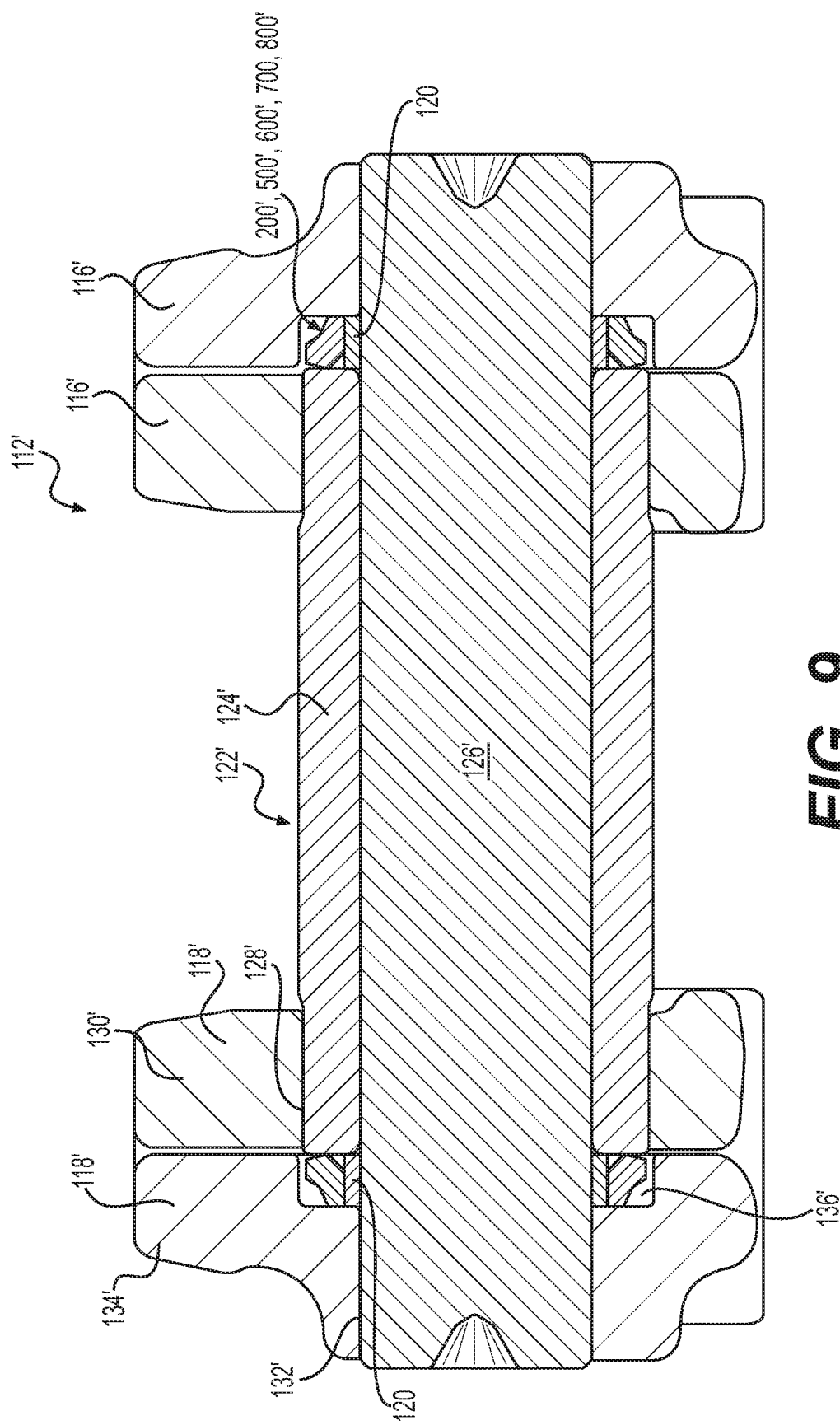
FIG. 9 is a cross-sectional view of another embodiment of a track chain assembly similar to that of FIG. 3 that may be used with the track chain of FIG. 2 on the machine of FIG. 1.

FIGS. 2, 3 and 9 respectively illustrate a perspective view and cross-sectional views of an exemplary chain assembly 112, 112' and, specifically, a plurality of exemplary link subassemblies 116, 116' utilizing various embodiments of a lip seal 200, 300, 400, 500, 600, 700, 800 according to the principles of the present disclosure. Each one of link subassemblies 116, 116' may include a respective pair of offset link members 118, 118' or a respective pair of inner and outer links when straight links are used (not shown).

Adjacent ones of link subassemblies 116, 116' may be interconnected by way of rod assemblies 122, 122' in the form of pins and/or bushings. More specifically, each rod assembly 122, 122' may include a substantially cylindrical bushing 124, 124' disposed about a substantially cylindrical pin 126, 126'. A pair of bearings (not shown) that are freely rotatable relative to pin 126, and a pair of seals 200, 300, 400, 500, 600, 700, 800 may also be provided in the rod assembly or in one of the link members proximate the rod assembly to prevent the loss of lubrication and provide freedom of movement. In FIG. 3, no thrust ring is employed while a thrust ring 120 is employed in FIG. 9. Other variations in the track chain assemblies 112, 112'.

The bushing 124, 124' may be pressed into an aperture 128, 128' of one end 130, 130' of the offset link member 118, 118' and the pin 126, 126' may extend through this end 130, 130' of the offset link member 118 and be received in the aperture 132, 132' of other end 134 of the adjacent offset link member 118, 118'. The pin 126, 126' may be retained in the other end 134 of the adjacent offset link member 118, 118' by being pressed into that link member 118, 118' or be retained therein using a cotter pin or another similar device when a slip fit is being used. Other configurations and methods of assembling the link subassemblies 116, 116' may be provided to create a track chain assembly 112, 112'. Of course, a plurality of offset link members 118, 118' are connected in a manner similar to what has just been described to form the track chain assembly 112, 112'.

More particularly, the first and second rod assemblies 122, 122' may interface with apertures 128, 128', 132, 132' of adjacent offset link members 118, 118' such that consecutively connected link subassemblies 116, 116' may be pivotally interconnected to one another to form the track chain assembly 112, 112'. For example, the outer end 134, 134' of one offset link member 118, 118' may mate in fixed manner with the pin 126, 126' (such as when a press fit is employed) and house the seals and/or bearings assemblies while the inner end 130, 130' of the adjacent offset link member 118, 118' may mate with the bushing 124, 124' in a fixed manner (such as when a press fit if employed). In other embodiments, the bushing 124' may be free to rotate. In either case, the pin 126, 126' may be free to rotate within the bushing 124, 124' such as when some clearance is provided between the pin and the bore of the bushing. Consequently, a pair of adjacent offset link members 118, 118' may be configured to pivot with respect to one another to form an articulating track chain assembly 112, 112'. In some embodiments, such as the one shown in FIG. 9, another pressing operation may later be employed to provide clearance between the adjacent links so that they can rotate relative to each other.

Various embodiments of seals such as lip seals that may be used with the track chain assemblies and machines just described will now be discussed. Various small features such as small radii (e.g. 1 mm+/−0.1 mm or less) that provide a transition from one feature to another may not specifically mentioned but are to be understood as being present in some embodiments. Hence, distances and dimensions are to be measured from theoretical sharp corner to theoretical sharp corner. Also, terms like "radially", "axially" and "circumferentially", etc. will be used to denote directions that are within+/−5 degrees of the respective direction (i.e. the radial direction, the axial direction, or the circumferential direction, etc.). All the geometry and features that will be described herein with reference to the various embodiments of the lips seals shown in FIGS. 3 thru 14 will be of the lip seal in a relaxed, uncompressed state, such as before the lip seal is inserted into a slot 136, 136' of the link member.

A seal 200, 200' according to an embodiment of the present disclosure will now be described with reference to FIGS. 4 thru 14. The seal 200, 200' may comprise an annular body 202, 202' defining a radial direction R, R', an axial direction A, A', and a circumferential direction C, C'. As best seen in FIGS. 5 and 11, the annular body 202, 202' may further define a cross-sectional area 204, 204' taken in a plane containing the radial direction R, R' and the axial direction A, A'.

Figure 6:
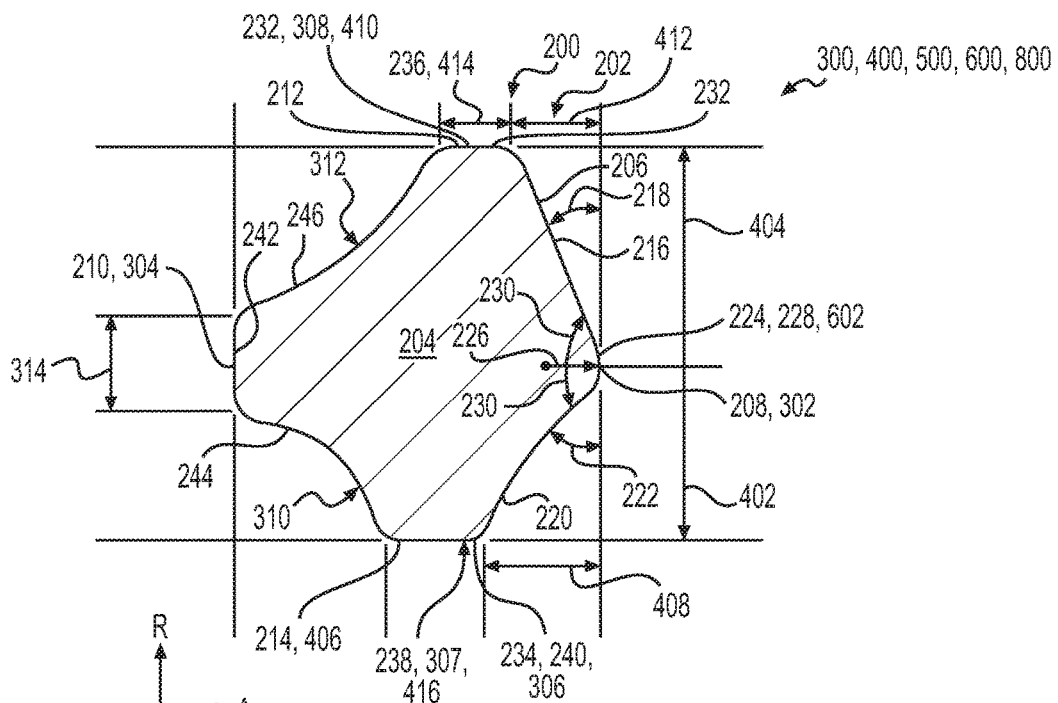
FIG. 6 is an enlarged detail view of the lip seal of FIG. 5, illustrating the top portion of the cross-sectional geometry more clearly.
Figure 7:
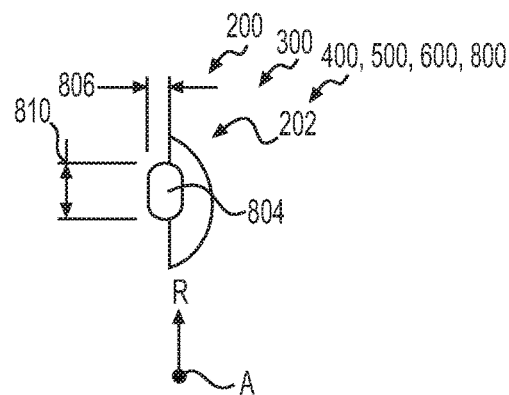
FIG. 7 is an enlarged front detail view of a tab extending from the outer circumference of the lip seal of FIG. 4.
Figure 8:
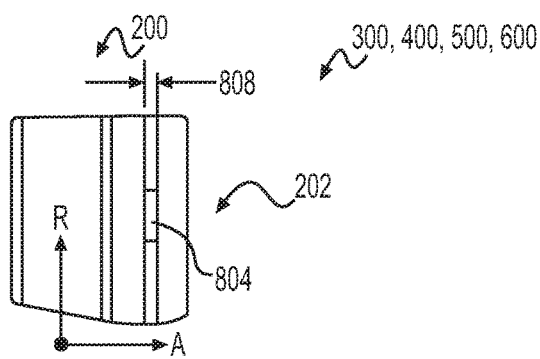
FIG. 8 is a side view of the lip seal of FIG. 4, illustrating the axial extent of the tab extending from the outer circumference of the lip seal.
Figure 12:
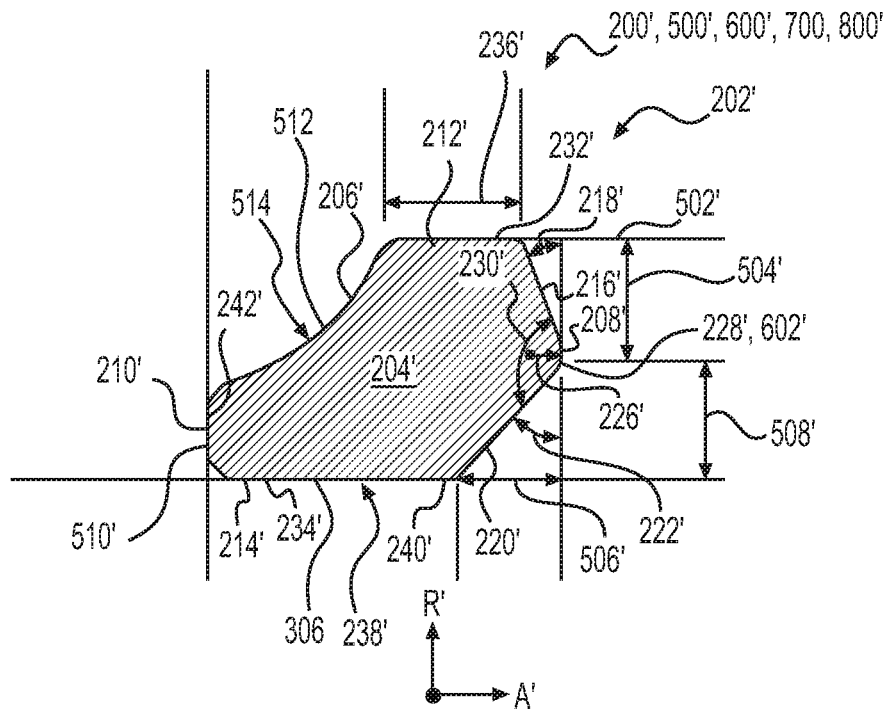
FIG. 12 is an enlarged detail view of the lips seal of FIG. 11, illustrating the top portion of the cross-sectional geometry more clearly.
Figure 13:
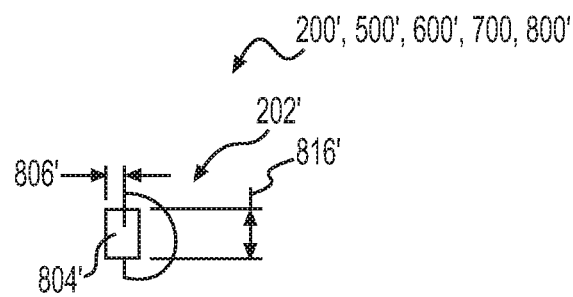
FIG. 13 is an enlarged front detail view of a tab extending from the outer circumference of the lip seal of FIG. 10.
Figure 14:
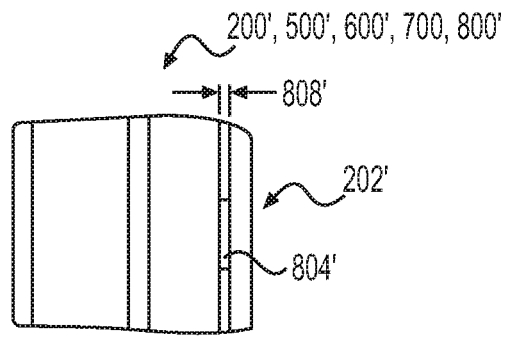
FIG. 14 is a side view of the lip seal of FIG. 10, illustrating the axial extent of the tab extending from the outer circumference of the lip seal.

Focusing now on FIGS. 6 and 12, the area 204, 204' may include a perimeter 206, 206'. The perimeter 206, 206' may comprise a first axial extremity 208, 208', a second axial extremity 210, 210', an outer radial extremity 212, 212', and an inner radial extremity 214, 214'.

The perimeter 206, 206' may include a first angled surface 216, 216' forming a first acute angle 218, 218' with the radial direction R, R' ranging from 10 degrees to 30 degrees, a second angled surface 220, 220' forming a second acute angle 222, 222' with the radial direction R, R' ranging from 30 degrees to 50 degrees, and a first convex arcuate surface 224, 224' interposed between the first angled surface 216, 216' and the second angled surface 220, 220'. The first convex arcuate surface 224, 224' may define the first axial extremity 208, 208' and may also define a first arcuate surface radius of curvature 226, 226' ranging from 0.01 mm to 1.0 mm. The first acute angle 218, 218' may be approximately 20 degrees+/−2 degrees in some embodiments while the second acute angle 222, 222' may be approximately 40 degrees+/−2 degrees in some embodiments. The first convex arcuate surface radius of curvature may be approximately 0.5 mm+/−0.1 mm in some embodiments. These configurations may be varied as needed or desired in other embodiments.

The first convex arcuate surface 224, 224' may include any surface that is not flat or straight including polynomial, elliptical, sinusoidal, etc. (thus the term "arcuate" as used herein should be interpreted broadly but in many or all instances includes the possible use of a pure radius). For the embodiment shown in FIGS. 6 and 12, the first convex arcuate surface 224, 224' may include a first radius 228, 228' that connects the first angled surface 216, 216' to the second angled surface 220, 220' directly. In other embodiments, other curves may connect the first radius 228, 228' to the first angled surface 216, 216' and to the second angled surface 220, 220'.

Similarly, the first angled surface 216, 216' may be continuously flat or straight and may extend from the outer radial extremity 212, 212'. The first angled surface 216, 216' may extend directly from the outer radial extremity 212, 212' or there may be another curve (e.g. a radius) interposed between the outer radial extremity 212, 212' and the first angled surface 216, 216'. Likewise, the second angled surface 220, 220' may be continuously flat or straight and may extend from the inner radial extremity 214, 214'. The second angled surface 220, 220' may extend directly from the inner radial extremity 214, 214' or there may be another curve (e.g. a radius) interposed between the inner radial extremity 214, 214' and the second angled surface 220, 220'. The first angled surface 216, 216' may form a first obtuse angle 230, 230' with the second angled surface ranging from 100 degrees to 140 degrees. In certain embodiments, the first obtuse angle 230, 230' may be approximately 120 degrees+/−2 degrees. These configurations may be varied as needed or desired in other embodiments.

The perimeter 206, 206' may further include a first axially extending surface 232, 232' defining the outer radial extremity 212, 212' and a radially inner arcuate surface 234, 234' defining the inner radial extremity 214, 214'. In some embodiments, the first axially extending surface 232, 232' is continuously flat or straight and the radially inner arcuate surface 234, 234' is convex. The first axially extending surface 232, 232' may define a first axial length 236, 236' ranging from 2 mm to 5 mm (approximately 2.8 mm+/−0.1 mm in FIG. 6, and approximately 4.24+/−0.1 mm in FIG. 12) and the radially inner arcuate surface 234, 234' may define a radially inner convexity value 238, 238' ranging from 0.01 mm to 0.3 mm (approximately 0.14 mm+/−0.01 in FIGS. 6 and 12). Similarly, the radially inner arcuate surface 234, 234, may define a curvilinear length 240, 240' ranging from 6 mm to 8 mm (see FIG. 12) or 1.5 mm to 3 mm (see FIG. 6). These configurations may be varied as needed or desired in other embodiments. Convexity may be measured using a spherometer that measures the radial distance (i.e. the sagittal) from an axially extending chord of a circular curve to the radial extremity of the circular curve.

Referring now only to FIG. 6, the perimeter 206 may further include a first radially extending surface 242 defining the second axial extremity 210, a first concave arcuate surface 244 that is interposed between the radially inner arcuate surface 234 and the first radially extending surface 244, and a second concave arcuate surface 246 that is interposed between the first radially extending surface 242 and the first axially extending surface 232. The first concave arcuate surface 244 may connect the radially inner arcuate surface 234 to the first radially extending surface 242 directly or there may be other curves (e.g. radii) that connect the first concave arcuate surface 244 to the first radially extending surface 242 and the radially inner arcuate surface 234. Likewise, the second concave arcuate surface 246 may connect the first radially extending surface 242 to the first axially extending surface 232 directly or there may be other curves (e.g. radii) that connect the second concave arcuate surface 246 to the first radially extending surface 242 and the first axially extending surface 232.

A second embodiment of a seal 300 according to the principles of the present disclosure will now be described with reference to FIGS. 4 thru 8. Looking at FIG. 5, the seal 300 may comprise an annular body 202 defining a radial direction R, an axial direction A, and a circumferential direction C. The annular body 202 may further define a cross-sectional area 204 taken along a plane containing the radial direction and the axial direction.

Focusing now on FIG. 6, the perimeter 206 may comprise a first axial extremity 208, a second axial extremity 210, an outer radial extremity 212, and an inner radial extremity 214. The perimeter 206 may include a first axial extremity defining surface 302 and a second axial extremity defining surface 304, a first concave arcuate surface 244 that is interposed between the inner radial extremity 214 and the second axial extremity 210, and a second concave arcuate surface 246 that is interposed between the outer radial extremity 212 and the second axial extremity 210.

The first axial extremity defining surface 302 includes a first convex arcuate surface 224 but other configurations such as flat or straight are possible. The second axial extremity defining surface 304 may include a first radially extending surface 242 but other configurations such as arcuate are possible.

The perimeter 206 may include an inner radial convex arcuate surface 306 defining the inner radial extremity 214, and an outer axially extending flat surface 308 defining the outer radial extremity 212. Other configurations are possible.

The first concave arcuate surface 244 may define a first concave arcuate surface radius of curvature 310 ranging from 10 mm to 12 mm and the second concave arcuate surface 246 may define a second concave arcuate surface radius of curvature 312 ranging from 8 mm to 10 mm. These configurations may be altered as needed or desired.

The first convex arcuate surface 224 may define a first convex arcuate surface radius of curvature 226 ranging from 0.01 mm to 3 mm and the first radially extending surface 242 defines a first radial length 314 ranging from 2 mm to 3 mm. The inner radial convex arcuate surface 306 may define an inner radial convexity value 307 ranging from 0.01 mm to 0.3 mm.

With continued reference to FIGS. 5 and 6, a seal 400 according to a third embodiment of the present disclosure will now be described. The seal 400 may comprise an annular body 202 defining a radial direction R, an axial direction A, and a circumferential direction C. The annular body 202 may further define a cross-sectional area 204 including a perimeter 206. The perimeter 206 may comprise a first axial extremity 208, a second axial extremity 210, an outer radial extremity 212, and an inner radial extremity 214.

The perimeter 206 may include a first axial extremity defining surface 302 and a second axial extremity defining surface 304, a first concave arcuate surface 310 interposed between the inner radial extremity 214 and the second axial extremity 210, a second concave arcuate surface 246 interposed between the outer radial extremity 212 and the second axial extremity 210, a first angled surface 216 interposed between the outer radial extremity 212 and the first axial extremity 208, and a second angled surface 220 interposed between the inner radial extremity 214 and the first axial extremity 208.

The first angled surface 216 may be continuously flat and the second angled surface 220 may also be continuously flat. In certain embodiments, the first angled surface 216 forms a first obtuse angle 230 with the second angled surface 220 ranging from 100 degrees to 140 degrees. This angle may be varied as needed or desired in other embodiments.

The inner radial extremity 214 may be spaced away from the first axial extremity 208 a first radial distance 402 ranging from 4 mm to 6 mm and the outer radial extremity 212 may be spaced away from the first axial extremity 208 a second radial distance 404 ranging from 5 mm to 7 mm. These dimensions may be varied as needed or desired in other embodiments.

The first axial extremity defining surface 302 may include a first convex arcuate surface 224 and the second axial extremity defining surface 304 may include a first radially extending surface 242. These surfaces may have other configurations as needed or desired in other embodiments.

The first concave arcuate surface 244 may define a first concave arcuate surface radius of curvature 310 ranging from 10 mm to 12 mm, the second concave arcuate surface 246 may define a second concave arcuate surface radius of curvature 312 ranging from 8 mm to 10 mm. These dimensions may be varied as needed or desired in other embodiments.

The perimeter 206 may further include an inner radial extremity defining surface 406 spaced away from the first axial extremity 208 a first axial distance 408 ranging from 3 mm to 5 mm and an outer radial extremity defining surface 410 spaced away from the first axial extremity 208 a second axial distance ranging from 1.5 mm to 3 mm. The outer radial extremity defining surface 410 may be flat and the inner radial extremity defining surface may be convex. These surfaces may have other configurations in other embodiments.

The outer radial extremity defining surface 410 may define an outer radial extremity defining surface length 414 ranging from 2.5 mm to 3.5 mm and the inner radial extremity defining surface 406 may define a convexity value 416 ranging from 0.01 mm to 0.3 mm. These dimensions may be varied as needed or desired in other embodiments.

Looking now at FIGS. 6 and 12, a seal 500, 500' according to a fourth embodiment of the present disclosure will now be described as follows. The seal 500, 500' may comprise an annular body 202, 202' defining a radial direction R, R', an axial direction A, A', and a circumferential direction C, C'. The annular body 202, 202' may further define a cross-sectional area 204, 204' including a perimeter 206, 206'.

The perimeter 206, 206' may comprise a first axial extremity 208, 208', a second axial extremity 210, 210', an outer radial extremity 212, 212', and an inner radial extremity 214, 214'. The perimeter 206, 206' may further include a first angled surface 216, 216' extending from the outer radial extremity 212, 212' forming a first acute angle 218, 218' with the radial direction R, R', a second angled surface 220, 220' extending from the inner radial extremity 214, 214' forming a second acute angle 222, 222' with the radial direction R, and a first axial extremity defining surface 302, 302' interposed between the first angled surface 216, 216' and the second angled surface 220, 220', and the first acute angle 218, 218' is less than the second acute angle 222, 222'.

The first angled surface 216, 216' forms a first obtuse angle 230, 230' with the second angled surface ranging from 100 degrees to 140 degrees.

The seal 500 may further comprise a first axially extending surface 232, 232' defining the outer radial extremity 212, 212' and an inner radial convex arcuate surface 306, 306' defining the inner radial extremity 214, 214'.

In FIG. 12, the first axially extending surface 232' may define a first axial length 236' ranging from 3.5 mm to 5 mm and the inner radial convex arcuate surface 306 may define a convex curvilinear length 240' ranging from 6 mm to 8 mm, and an inner radial convexity value 307 ranging from 0.01 mm to 0.3 mm. Any of these dimensions may be varied as needed or desired in other embodiments.

The first angled surface 216' may define a first angled surface axial dimension 502' ranging from 0.5 mm to 2.0 mm and a first angled surface radial dimension 504' ranging from 3.5 mm 4.5 mm and the second angled surface 220' defines a second angled surface axial dimension 506' ranging from 2.5 mm to 4.0 mm and a second angled radial dimension 508' ranging from 3.0 mm to 4.0 mm. Dimensions may be varied.

In FIGS. 6 and 12, the first axial extremity defining surface 302, 302' may comprise a first convex arcuate surface 224, 224' defining a first convex arcuate surface radius of curvature ranging 226, 226' from 0.01 mm to 1.0 mm. Other values of curvature as well as other types of surfaces may be employed.

In FIGS. 6 and 12, the seal 500, 500' may further comprise a first radially extending surface 242, 242' defining the second axial extremity 210, 210'. The first radially extending surface 242' may define a first radial length 510, 510' ranging from 2.0 mm to 3.5 mm.

In FIG. 12, the seal 500' may further comprise a single concave arcuate surface 512 interposed between the outer radial extremity 212' and the first axially extending surface 232'. The single concave arcuate surface 512 may define a single concave arcuate surface radius of curvature 514 ranging from 6 mm to 8 mm.

Any of the configurations or dimensions of the fourth embodiment may be varied as needed or desired in other embodiments.

With continued reference to FIGS. 6 and 12, a seal 600, 600' according to a fifth embodiment will now be described. The seal 600, 600' may comprise an annular body 202, 202' defining a radial direction R, R', an axial direction A, A', and a circumferential direction C, C'. The seal 600 may further define a cross-sectional area 204, 204' including a perimeter 206, 206'. The perimeter 206, 206' may comprise a first axial extremity 208, 208', a second axial extremity 210, 210', an outer radial extremity 212, 212', and an inner radial extremity 214, 214'. The perimeter 206, 206' may further include a first axially extending surface 232, 232' defining the outer radial extremity 212, 212' and an inner radial convex arcuate surface 306, 306' defining the inner radial extremity 214, 214'.

In FIG. 6, the first axially extending surface 232 may define a first axial length 236 ranging from 2 mm to 3.5 mm. The inner radial convex arcuate surface 306 may define an inner radial convexity value 307 ranging from 0.01 mm to 0.3 mm. In particular embodiments, this value may be approximately 0.14 mm. In addition, the inner radial convex arcuate surface 306 may define a curvilinear length 240 ranging from 1.5 mm to 2.5 mm and a ratio of the first axial length 236 to the curvilinear length 240 may range from 2.0 to 1.0.

In FIG. 12, the first axially extending surface 232' may define a first axial length 236' ranging from 3.5 mm to 5.0 mm. The inner radial convex arcuate surface 306' may define an inner radial convexity value 307' ranging from 0.01 mm to 0.3 mm. Furthermore, the inner radial convex arcuate surface 306' may define a curvilinear length 240' ranging from 6 mm to 8 mm and a ratio of the first axial length 236' to the curvilinear length 240' may range from 0.01 to 1.0.

In FIGS. 6 and 12, the seal 600, 600' may further comprise a first convex arcuate surface 224, 224' that defines the first axial extremity 208, 208' and a first radially extending surface 242, 242' that defines the second axial extremity 210, 210'. The first radially extending surface 242, 242' may define a first radial length 314, 314' and the first convex arcuate surface 224, 224' may define a first convex arcuate surface curvilinear length 602, 602' that is less than the first radial length 314, 314'. As shown in FIG. 12, the first radial length 314' may terminate radially below the first convex arcuate surface 224'.

Any of the dimensions or configurations for the fifth embodiment may be varied as needed or desired in other embodiments.

A seal 700 according to a sixth embodiment of the present disclosure will now be described with reference to FIG. 12. The seal 700 may comprise an annular 202' body defining a radial direction R', an axial direction A', and a circumferential direction C' that defines a cross-sectional area 204' including a perimeter 206'. The perimeter 206' may comprise a first axial extremity 208', a second axial extremity 210', an outer radial extremity 212', and an inner radial extremity 214'.

The perimeter 206' may include a first axial extremity defining surface 302' and a second axial extremity defining surface 304', a single concave arcuate surface 512 interposed between the outer radial extremity 212' and the second axial extremity 210', a first angled surface 216' interposed between the outer radial extremity 212' and the first axial extremity 208', a second angled surface 220' interposed between the inner radial extremity 214' and the first axial extremity 208', an inner radial extremity defining surface 406', and an outer radial extremity defining surface 410'.

The inner radial extremity defining surface 406' may define a convexity value 416 ranging from 0.1 mm to 0.2 mm. Also, the first angled surface 216' may define a first acute angle 218' with the radial direction R', the second angled surface 220' may define a second acute angle 222' with the radial direction R', and the first acute angle 218' may be less than the second acute angle 222'. The single concave arcuate surface 512 may define a single concave arcuate surface radius of curvature 514 ranging from 6 mm to 8 mm.

Any of the configurations or dimensions of the sixth embodiment may be varied as needed or desired in other embodiments.

A seal 800, 800' according to a seventh embodiment of the present disclosure may be understood looking at FIGS. 4, 7, 8, 10, 13 and 14. The seal 800, 800' may comprise an annular body 202, 202' defining a radial direction R, R', an axial direction A, A', and a circumferential direction C, C'. The annular body 800, 800' may further define an outer circumferential surface 802, 802' and may include at least three tabs 804, 804' extending from the outer circumferential surface 802, 802' forming a circular array about the axial direction A, A' such that the at least three tabs 804, 804' are evenly spaced from each other (e.g. at 120 degree intervals). The outer circumferential surface 802, 802' may define an outer radial extremity 212, 212' and the at least three tabs 804, 804' may extend from the outer radial extremity 212, 212'.

As shown in FIGS. 4, 7, 8, 10, 13 and 14, each of the at least three tabs 804, 804' may be identically configured. This may not be the case for other embodiments. In like fashion, each of the at least three tabs 804, 804' may extend a first distance 806, 806' from the outer radial extremity 212, 212' in the radial direction R, R' ranging from 0.9 mm to 1.3 mm. Also, each of the at least three tabs 804, 804' may define a thickness 808, 808' in the axial direction A, A' ranging from 0.4 mm to 0.8 mm, and a height 810, 810' measured in a direction perpendicular to the first distance 806, 806' and the thickness 808, 808' ranging from 2.7 mm to 3.3 mm.

Any of the dimensions, configurations, etc. discussed herein may be varied as needed or desired to be different than any value or characteristic specifically mentioned herein or shown in the drawings for any of the embodiments.

INDUSTRIAL APPLICABILITY

In practice, a seal, a track chain assembly, and/or a machine using any embodiment disclosed herein may be sold, bought, manufactured or otherwise obtained in an OEM (original equipment manufacturer) or after-market context. In particular, the seals may be provided so that they can be inserted into the slots of track link members of track chain assemblies already in the field. That is to say, the track chain assemblies already in the field may be retrofitted with the seals disclosed herein.

The seal may be manufactured using a plastic material and may be injection molded, etc. The plastic material may be a polyurethane with a 53 shore D hardness. Other materials and/or other values for the hardness are possible.

Regarding the tabs discussed in FIGS. 4, 7, 8, 10, 13 and 14, these may be used when installing the seal in the slots of the track links shown in FIGS. 3 and 9 to help retain the seal in the track links while the track chain assembly is being assembled.

Regarding the first convex arcuate surface, it may act as a lip sealing portion as it presses upon the bushing as shown in FIGS. 3 and 9.

Regarding the convexity value of the inner radial extremity defining surface, it may help to provide the desired load or pressure so that an effective seal is formed by the lip sealing portion of the seal.

The outer radial extremity defining surface and the second axial extremity defining surface may provide enough support as they contact the walls of the slot of the track link to create the desired lip sealing force.

The geometry of the seals shown in the drawings may simplify the mold design and molding operation by eliminating the undercuts of the 'W' seal which require 'side pulls' in the mold. Some embodiments of a seal may be used with a thrust ring, while other embodiments of a seal may be used without a thrust ring. In many embodiments, the seal geometry may move the maximum sealing pressure radially outward on the bushing face (in comparison to the current 'W' seal) and may maintain contact pressure on other mating surfaces within ranges that are acceptable.

The seal shown in FIG. 4 may have an inner diameter of approximately 46 mm. In FIG. 6, the seal may define a radial height (maximum dimension along the radial direction of the cross-sectional area) of approximately 11.3 mm and an axial width (maximum dimension along the axial direction of the cross-sectional area) of approximately 10.7 mm.

The seal shown in FIG. 10, the seal may have an inner diameter of approximately 54 mm. In FIG. 12, the seal may define a radial height (maximum dimension along the radial direction of the cross-sectional area) of approximately 7.4 mm and an axial width (maximum dimension along the axial direction of the cross-sectional area) of approximately 11.0 mm.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A seal comprising:
    an annular body defining a radial direction, an axial direction, and a circumferential direction; and
    further defining a cross-sectional area including a perimeter,
        the perimeter comprising
            a first axial extremity,
            a second axial extremity,
            an outer radial extremity,
            an inner radial extremity,
            a single concave surface between the inner radial extremity and the second axial extremity,
            a single concave surface between the outer radial extremity and the second axial extremity,
            a first angled surface forming a first acute angle with the radial direction ranging from 10 degrees to 30 degrees,
            a second angled surface forming a second acute angle with the radial direction ranging from 30 degrees to 50 degrees, the second acute angle being different from the first acute angle, and
        a convex arcuate surface interposed between the first angled surface and the second angled surface,
            the convex arcuate surface defining the first axial extremity and defining a convex arcuate surface radius of curvature ranging from 0.01 mm to 1.0 mm.

2. The seal of claim 1, wherein the convex arcuate surface radius connects the first angled surface to the second angled surface.

3. The seal of claim 1,
    wherein the first angled surface extends from the outer radial extremity,
    wherein the second angled surface extends from the inner radial extremity, and
    wherein the first angled surface forms an obtuse angle with the second angled surface ranging from 100 degrees to 140 degrees.

4. The seal of claim 1, wherein an axially extending surface defines the outer radial extremity, and
    wherein a radially inner arcuate surface defines the inner radial extremity.

5. The seal of claim 4, wherein the axially extending surface defines an axial length ranging from 2 mm to 5 mm, and
    wherein the radially inner arcuate surface defines a radially inner convexity value ranging from 0.01 mm to 0.3 mm.

6. The seal of claim 4, wherein the radially inner arcuate surface defines a curvilinear length ranging from 6 mm to 8 mm or 1.5 mm to 3 mm.

7. The seal of claim 4,
    wherein a radially extending surface defines the second axial extremity,
    wherein the single concave surface between the inner radial extremity and the second axial extremity is interposed between the radially inner arcuate surface and the radially extending surface, and
    wherein the single concave surface between the outer radial extremity and the second axial extremity is interposed between the radially extending surface and the axially extending surface.

8. A seal comprising:
an annular body defining a radial direction, an axial direction, a circumferential direction, and a cross-sectional area that includes a perimeter,
the perimeter comprising
a first axial extremity,
a second axial extremity,
an outer radial extremity, and
an inner radial extremity,
a first angled surface forming a first acute angle that is equal to or less than 30 degrees,
a second angled surface forming a second acute angle that is greater than 30 degrees,
a single concave arcuate surface interposed between the inner radial extremity and the second axial extremity,
a single concave arcuate surface interposed between the outer radial extremity and the second axial extremity, and
a convex arcuate surface interposed between the first angled surface and the second angled surface.

9. The seal of claim 8,
wherein the perimeter further comprises a first axial extremity defining surface and a second axial extremity defining surface,
wherein the first axial extremity defining surface includes the convex arcuate surface, and
wherein the second axial extremity defining surface includes a radially extending surface.

10. The seal of claim 8,
wherein an inner radial convex arcuate surface defines the inner radial extremity, and
wherein an outer axially extending flat surface defines the outer radial extremity.

11. The seal of claim 8,
wherein the single concave arcuate surface interposed between the inner radial extremity and the second axial extremity defines a first concave arcuate surface radius of curvature ranging from 10 mm to 12 mm, and
wherein the single concave arcuate surface interposed between the outer radial extremity and the second axial extremity defines a second concave arcuate surface radius of curvature ranging from 8 mm to 10 mm.

12. The seal of claim 8, wherein the convex arcuate surface defines a convex arcuate surface radius of curvature ranging from 0.01 mm to 3 mm.

13. The seal of claim 10, wherein the inner radial convex arcuate surface defines a radially inner convexity value ranging from 0.01 mm to 0.3 mm.

14. A system comprising:
a track chain assembly; and
a seal configured to be used for the track chain assembly, the seal comprising an annular body defining a radial direction, an axial direction, a circumferential direction, and a cross-sectional area that includes perimeter,
the perimeter comprising:
a first axial extremity,
a second axial extremity,
an outer radial extremity, and
an inner radial extremity,
a single concave arcuate surface interposed between the inner radial extremity and the second axial extremity,
a single concave arcuate surface interposed between the outer radial extremity and the second axial extremity,
a first angled surface interposed between the outer radial extremity and the first axial extremity, wherein the first angled surface forms a first acute angle that is between 10 degrees and 30 degrees,
a second angled surface interposed between the inner radial extremity and the first axial extremity, wherein the second angled surface forms a second acute angle that is bigger than 30 degrees, and
a convex arcuate surface interposed between the first angled surface and the second angled surface.

15. The system of claim 14,
wherein the first angled surface is continuously flat,
wherein the second angled surface is continuously flat, and
wherein the first angled surface forms an obtuse angle with the second angled surface ranging from 100 degrees to 140 degrees.

16. The system of claim 14,
wherein the inner radial extremity is spaced away from the first axial extremity a first radial distance ranging from 4 mm to 6 mm, and
wherein the outer radial extremity is spaced away from the first axial extremity a second radial distance ranging from 5 mm to 7 mm.

17. The system of claim 14,
wherein the perimeter further comprises a first axial extremity defining surface and a second axial extremity defining surface,
wherein the first axial extremity defining surface includes the convex arcuate surface, and
wherein the second axial extremity defining surface includes a first radially extending surface.

18. The system of claim 14,
wherein the single concave arcuate surface interposed between the inner radial extremity and the second axial extremity defines a first concave arcuate surface radius of curvature ranging from 10 mm to 12 mm, and
wherein the single concave arcuate surface interposed between the outer radial extremity and the second axial extremity defines a second concave arcuate surface radius of curvature ranging from 8 mm to 10.

19. The system of claim 14,
wherein the perimeter further comprises:
an inner radial extremity defining surface spaced away from the first axial extremity a first axial distance ranging from 3 mm to 5 mm, and
an outer radial extremity defining surface spaced away from the first axial extremity a second axial distance ranging from 1.5 mm to 3 mm,
wherein the outer radial extremity defining surface is flat, and
wherein the inner radial extremity defining surface is convex.

20. The system of claim 19,
wherein the outer radial extremity defining surface defines an outer radial extremity defining surface length ranging from 2.5 mm to 3.5 mm, and
wherein the inner radial extremity defining surface defines a convexity value ranging from 0.01 mm to 0.3 mm.

* * * * *